(12) United States Patent
Szanto et al.

(10) Patent No.: US 11,586,987 B2
(45) Date of Patent: Feb. 21, 2023

(54) DYNAMICALLY UPDATED TEXT CLASSIFIER

(71) Applicant: Kensho Technologies, LLC, Cambridge, MA (US)

(72) Inventors: Aron Szanto, New York, NY (US); Sireesh Gururaja, New York, NY (US); Domenic Puzio, Arlington, VA (US)

(73) Assignee: Kensho Technologies, LLC, Cambridge, MA (US)

( * ) Notice: Subject to any disclaimer, the term of this patent is extended or adjusted under 35 U.S.C. 154(b) by 1023 days.

(21) Appl. No.: 16/293,225

(22) Filed: Mar. 5, 2019

(65) Prior Publication Data

US 2020/0286002 A1    Sep. 10, 2020

(51) Int. Cl.
*G06N 20/20* (2019.01)
*G06K 9/62* (2022.01)
*G06F 40/30* (2020.01)

(52) U.S. Cl.
CPC ............ *G06N 20/20* (2019.01); *G06F 40/30* (2020.01); *G06K 9/6267* (2013.01)

(58) Field of Classification Search
CPC ....... G06F 40/30; G06K 9/6267; G06N 20/20
USPC .......................................................... 706/12
See application file for complete search history.

(56) References Cited

U.S. PATENT DOCUMENTS 9,390,086 B2 *   7/2016  Lisuk ................... G06F 40/117
10,235,994 B2 *  3/2019  Huang .................. G06N 3/0454
10,664,722 B1 *  5/2020  Sharma .................. G06V 10/17
2018/0096219 A1 * 4/2018 Socher ................ G06K 9/6219
2020/0142999 A1 * 5/2020 Pedersen ............. G06K 9/6256

OTHER PUBLICATIONS

Markou et al., "A Neural Network-Based Novelty Detector for Image Sequence Analysis", 2006, IEEE, vol. 28, No. 10, pp. 1664-1677. (Year: 2006).*
Forman, "An Extensive Empirical Study of Feature Selection Metrics for Text Classification", 2003, Hewlett-Packard, 17 pages. (Year: 2003).*
Lea Vega et al.; *Dynamic Neural Networks for Text Classification*; 2016 International Conference on Computational Intelligence and Applications (ICCIA); Dept. of Electrical Engineering and Computer Science; Jeju, 2016, pp. 6-11.
Doan S., Horiguchi S. (2006) *Dynamic Feature Selection in Text Classification*. In: Huang DS., Li K., Irwin G.W. (eds) Intelligent Control and Automation. Lecture Notes in Control and Information Sciences, vol. 344, Springer, Berlin, Heidelberg; pp. 664-675.

* cited by examiner

*Primary Examiner* — Ted T. Vo
(74) *Attorney, Agent, or Firm* — Yee & Associates, P.C.

(57) ABSTRACT

Methods and systems for dynamically updating machine learning models such as text classifiers. One of the methods includes: receiving first data; producing a first machine learning model using the first data; releasing the first machine learning model for use; receiving second data after receipt of the first data; determining that the second data has a difference metric relative to the first data that exceeds a difference threshold; retraining the first machine learning model using at least part of the second data, the retraining producing a second machine learning model; and releasing the second machine learning model for use.

9 Claims, 4 Drawing Sheets

220 produce a text classifier using first data 222 release the first test classifier for use 224 receive second data after release of the first text classifier 226 determine that a difference metric for the second data vs the first data exceeds a difference threshold 228 retrain the 1st machine learning model using the 2nd data to produce a 2nd text classifier 230 release the second text classifier for use 232 determine a concept for text and a corresponding concept label confidence score 234 determine whether the text labeled with a concept should be relabeled based on the concept label confidence score 236

DYNAMICALLY UPDATED TEXT CLASSIFIER

BACKGROUND

Technical Field

This specification relates to dynamically updating machine learning models such as text classifiers.

Background

Many individuals and institutions use machine learning in a variety of contexts. For example, natural-language processing (NLP) applications use machine learning to detect what certain text (e.g., a document, paragraph, or sentence) is about or to detect the sentiment of the text.

SUMMARY

This specification describes technologies for dynamically updating machine learning models, e.g., for dynamically updating a text classifier when words used to describe a concept change over time. At the most basic level, the process of training a machine learning model can include: (i) gathering a known dataset for which one has already identified what the model is going to try to identify/label/tag/organize; (ii) running the model on the known dataset to see what results it produces; (iii) improving the model by updating it in accordance with the mistakes that it made in step (ii), and (iv) repeating steps (ii)-(iii) until the model's accuracy does not improve further by a specified threshold. Generally, machine learning models that classify text are called "text classifiers". Stated differently, this specification discloses a fast, reproducible, automated system for (i) building (ii) deploying and (iii) retraining production machine learning models such as text classifiers.

In general, one innovative aspect of the subject matter described in this specification can be embodied in methods that include the actions of: receiving first data; producing a first machine learning model using the first data; releasing the first machine learning model for use; receiving second data after receipt of the first data; determining that the second data has a difference metric relative to the first data that exceeds a difference threshold; retraining the first machine learning model using at least part of the second data, the retraining producing a second machine learning model; and releasing the second machine learning model for use.

Another innovative aspect of the subject matter described in this specification can be embodied in methods that include the actions of: receiving post release data (e.g., post release documents) after a first machine learning model (e.g., a first text classifier) has been released, the first machine learning model having been trained using first data (e.g., a first set of documents); determining that the post release data has a difference metric relative to the first data that exceeds a difference threshold; and retraining the first machine learning model (e.g., a first text classifier) to produce a second machine learning model (e.g., a second text classifier) using at least part of the post release data (e.g., post release documents). The method can include forwarding the second machine learning model for use or receiving a new document and determining a concept associated with the new document using the second machine learning model e.g., the second text classifier.

Other embodiments of these aspects include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Releasing the first machine learning model for use can include: determining a performance metric for the first machine learning model; and determining that the performance metric for the first machine learning model exceeds a performance threshold. Using the first data to produce a first machine learning model can include using at least a portion of the first data to produce a plurality of machine learning models and releasing the first machine learning model for use can include selecting a first machine learning model to release, from the plurality of machine learning models, based at least in part on the performance metric.

The first machine learning model can be a first text classifier and the second machine learning model can be a second text classifier, the first data can be first documents and the second data can be second documents, and determining that the second data has a difference metric relative to the first data that exceeds a difference threshold can include determining that the second documents have a difference metric relative to the first documents that exceeds a difference threshold based at least in part on the words used in the first or second documents to describe the concept.

The method can further include: determining, at a concept labeling engine, at least one concept for a document and a concept label confidence score (indicating a level of confidence with which the concept labeling engine has labeled a document with a concept); and determining, at an active learning engine, whether a document labeled by the concept labeling engine should be assigned a ground truth label based at least in part on the value of the concept label confidence score, e.g., based at least in part on whether the confidence score demonstrates uncertainty.

The method can further include: receiving first data; using the first data to produce the first machine learning model; and forwarding the first machine learning model for use prior to receiving the post release data.

Receiving first data can include automatically sampling data to produce sampled first data and using the first data to produce a first machine learning model can include using the sampled first data to produce the first machine learning model.

Receiving first data can include augmenting the sampled first data to produce augmented sampled first data and using the first data to produce a first machine learning model can include using the augmented sampled first data to produce the first machine learning model. The method can further include selecting data from the post release data, possibly augmented, to use at least in part in retraining the first machine learning model.

The subject matter described in this specification can be implemented in particular embodiments so as to realize one or more of the following advantages. Embodiments described in this specification can monitor deployed machine learning models such as deployed text classifiers and can dynamically update such models when appropriate, e.g., when the words used to describe relevant concepts in recent text change, beyond a specified difference metric threshold, relative to the words used to describe the concepts in the initial training set of documents or of all documents captured at the time of training, regardless of their inclusion in a training set. The systems and methods for the dynamic updating of machine learning models such as text classifiers described in this invention can inexpensively and quickly produce machine learning models that keep pace with changes in how concepts are described in text, e.g., in documents. Such systems and methods can eliminate human error, free up engineering resources, reduce the amount of human expert-generated data required to produce and maintain a machine learning model, improve text classification models over time and automatically, and avoid errors and problems from reliance on text classification models that are no longer accurate.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes technologies for dynamically updating machine learning models such as text classifiers. These technologies provide a fast, reproducible, automated system for (i) building (ii) deploying, and (iii) dynamically updating production machine learning models.

Figure 1:
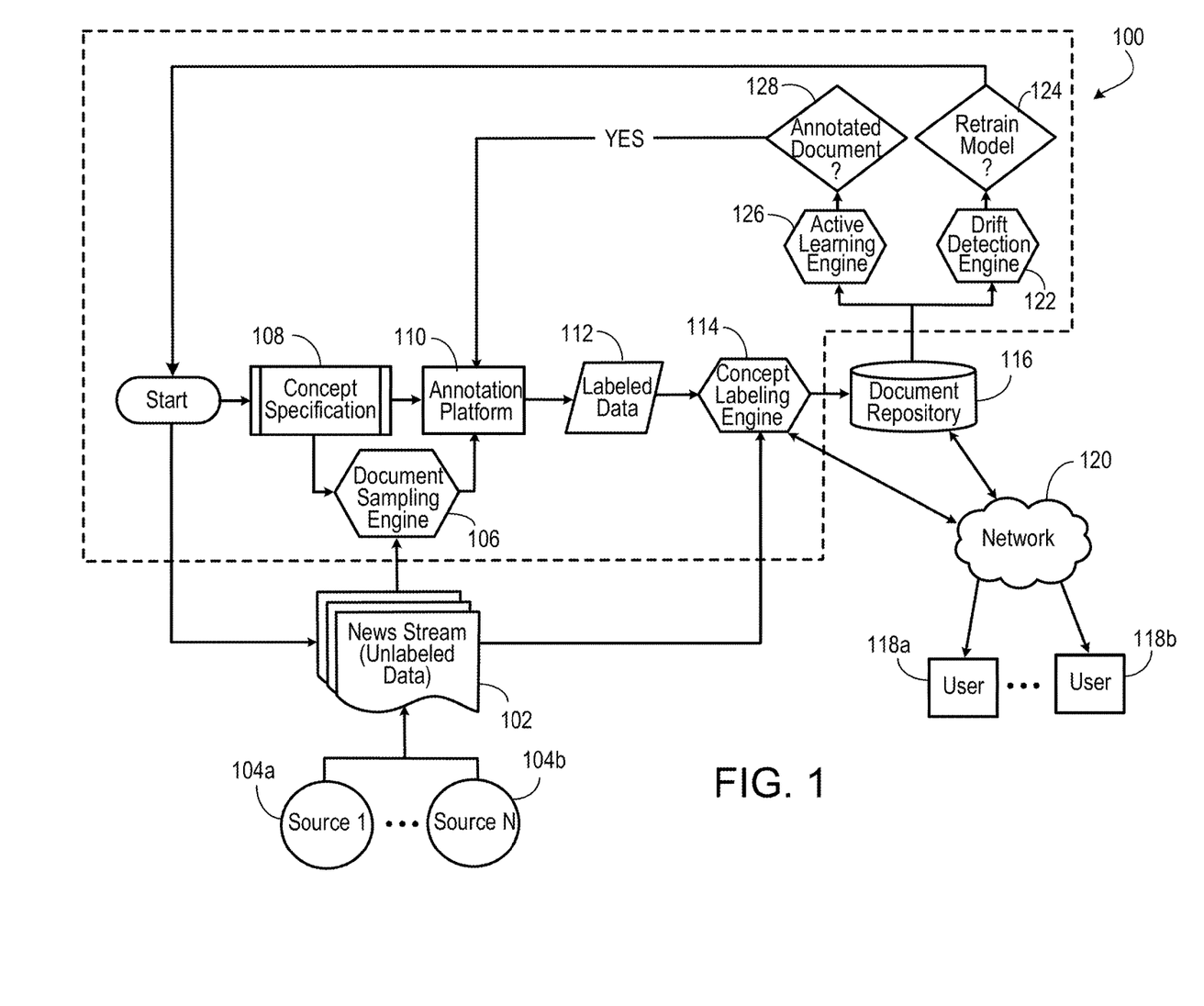
FIG. 1 is a block diagram of an example of a system for dynamically updating a text classifier.

FIG. 1 shows an example of a dynamic text classifier production system 100. A document sampling engine 106 in the system 100 receives unlabeled data 102, e.g., in the form of a news stream, from a variety of sources 104a, 104b, and samples unlabeled data taking into account a specification 108 of a concept. There can be a plurality of concepts and one specification per concept. The specification can be updated if an initial round of documents (e.g., of 100 documents), each of which is annotated by two or more annotators, results in a sufficiently large number of inter-annotator disagreements or of "unknown" labels (e.g., wherein at least one annotator indicated that a positive or negative label for a concept could not be comfortably associated with a specific document). This suggests that the specification resulted in either: 1) disagreement as to the application of the specification to the documents, or 2) at least one annotator not being able to assign a label due to ambiguity in the specification.

After this initial set of annotations is completed and the specification produces acceptable agreement between annotators, the specification is left immutable so as to maintain consistent model outputs through time.

The document sampling engine 106 can use more than one method to determine which unlabeled data to forward on to an annotation platform 110. One method uses the concept specification, which includes a list of keywords associated with the concept. The sampling engine can also draw on information in a knowledge base to identify related companies, entities, and keywords. The sampling engine uses this gathered information (e.g., keywords and knowledge base artifacts) as part of a holistic search routine to find documents that can make up a concept model training set.

The document sampling engine 106 can select, using a few keywords associated with a topic, a small set of initial training articles that are selected for information richness. The document sampling engine can select the articles on the basis of the articles containing keywords and other data associated with a concept as discussed above. However, this set of selected documents can then be filtered for information richness, for example curating a set of relevant documents being sufficiently different from each other so as to cover a broad spectrum of articles that may be about the concept. The document sampling engine may sample the documents adversarially, meaning that the engine can choose a number of articles that are unrelated to the concept but may be initially confusing to the model (due to the articles nevertheless containing language that may otherwise be associated with the concept) in order to force the model to learn to generalize to unseen examples. A concrete example of the latter is as follows: When training a model for the "Cybersecurity" concept, a model may initially learn to associate the word "breach" with the concept without appropriate context, so the document sampling engine can sample documents unrelated to cybersecurity that use the word "breach", such as those that use the word in the sense of "breach of contract". In doing so, the document sampling engine forces the model to learn words and context that are truly descriptive and typical of the concept, rather than ones that may be ambiguous and spuriously correlated with the concept.

By intelligently extracting a subset of articles (e.g., 400) out of a large database (e.g., of several million articles), the process of manually curating a large novel training dataset, a standard component of text-based machine learning, is significantly shortened. Second, the system can be optimized to accurately identify relevant articles based on only the limited training examples the sampling system has selected, whereas many existing text classification systems require thousands or millions of examples. Since in conventional machine learning each training example typically requires a human to assign it a label having a large training data set results in a long development time.

The concept model can comprise a much broader set of artifacts, not just the words that can be used to describe a concept. For example, it can take into account contextual information about the documents that describe a concept, or (without taking into account the meaning of words at all) simply the number of words in a document.

The document sampling engine 106 forwards the unlabeled data samples to an annotation platform 110. The annotation platform can be an annotation engine that automatically annotates the sampled unlabeled data or the annotation platform can be a platform for capturing annotations assigned by human annotators of the sampled unlabeled data, or it can be a combination of an automatic annotation engine and a platform for capturing the annotations of human annotators.

The annotation platform 110 uses the annotations to create labeled data and forwards the labeled data 112 to a concept labeling engine 114. The phrase "concept labeling engine and the phrase "concept model" are used interchangeably in this specification.

The concept labeling engine 114 can use the labeled data to train, and provide as a service, a machine learning model such as a text classifier. Once the machine learning model is trained, the concept labeling engine 114 can receive unlabeled data 102 and provide labeled data, e.g., current news documents labeled with concepts. These documents labeled with concepts can then be stored in a document repository 116. Users 118a, 118b, e.g., can access the concept labeling engine 114 or labeled documents in the document repository via a network 120. Examples of services that can use the concept labeling engine and/or the labeled documents in the document repository include services such as concept tagging, trend analysis, sentiment analysis, junk text detection, and opinion detection.

The concept labeling engine 114 classifies data, e.g., documents, by their degree of relation to a concept. The concept labeling engine can contain a parameterized representation of language (a "language model") that captures the difference in word statistics between positive and negative documents (those about the concept vs. those not about the concept).

The relationship between the language model and the concept labeling engine 114 as a whole is that the concept labeling engine 114 relies on two static distributions: that which captures word statistics for positive documents, and that which captures word statistics for negative documents. Its internal "language model" is trained to estimate these two distributions and uses it throughout its lifetime to deduce whether a given document is about the concept by comparing the document's words to its language model.

The concept labeling engine 114 can reference numbers associated with words or phrases in a full vocabulary (e.g., an English vocabulary) denoting each word's or phrase's relevance to a concept; or it can reference a mathematical description that uses contextual relationships between words to determine whether the words, taken together, contain meaning that is about a specified concept. The concept labeling engine 114 can also use statistics outside of the words of the document, for example the overall length of the text, in making its concept labeling determination. Thus, the concept labeling engine can determine the degree of relevance of a given document to a concept.

A drift detection engine 122 monitors overall distributional statistics of article language and model output. The drift detection engine 122 can identify when the distribution of words that the concept labeling engine 114 is exposed to at prediction time has deviated beyond a threshold from the distribution on which the engine was trained, resulting in degraded model performance. This kind of drift can cause the concept model's predictions to degrade in quality because the language model in the concept labeling engine no longer reflects the data that the classifier currently is processing. Because of the differences between each individual concept and associated true, evolving word distribution, the system can run one drift detection model per concept that is solely responsible for detecting when the word distribution for a concept has drifted sufficiently from that which corresponds to the language model learned by its associated concept model at the time the concept model was trained.

If the drift detection engine 122 determines that the current classifier for a concept has become unsuitable because the underlying language model for the concept has shifted, the engine 122 triggers 124 a retraining step whereby new documents are sampled and labeled. In other words, the drift detection model can trigger a retraining, e.g., a full retraining, of the concept model if it detects a macroscopic divergence between concept-related article language at the current time versus at the time the concept model was originally trained.

The drift detection engine 122 combines several metrics that capture linguistic drift, including the change in the distribution over predictions that the model makes, the change in the number of articles tagged positively, the rate of incidence in positively-labeled documents of the top (e.g., 50) words or phrases that the concept model associates with the concept, and other factors that determine whether the language associated with the concept has changed significantly since the time that the model was initially trained. If the drift metric exceeds a threshold, retraining is triggered. As an example, the drift detection engine 122 can trigger a retraining when the number of articles tagged positively for a concept has moved above or below two standard deviations (calculated over the year before the classifier was trained) for 10 days in the last month. As another example, the drift detection engine 122 may trigger a retraining of the present model when the Kullback-Leibler divergence between the distribution of predictions the present model made for the year before the classifier was trained and the distribution of predictions the present model made in the last month is above a specified threshold.

The system 100 can further include an active learning engine 126. The active learning engine 126 determines 128, for each document in a repository, e.g., the document repository 116, whether it should be given a ground-truth label, e.g., by a human. This determination 128 is based on several factors, including whether the article at hand is very different from any article in the current training set and whether the model is particularly uncertain about the proper tag for that article as reflected by an uncertainty metric. If so determined, that document is fed back into the annotation process, associating it with an expert label, adding it to labeled data, and possibly retraining the current model. In one implementation, a concept label confidence score can have a range of from 0 to 1 with a score of 1 reflecting highest confidence and the system can set a threshold metric, e.g., a confidence score of 0.7 as a threshold for attaching a concept label to a document. The uncertainty metric can be set to collect documents that fall within a certain window, e.g., within 0.05 of the confidence score threshold or it can be adjusted so that a certain number of documents are selected.

Figure 2A:
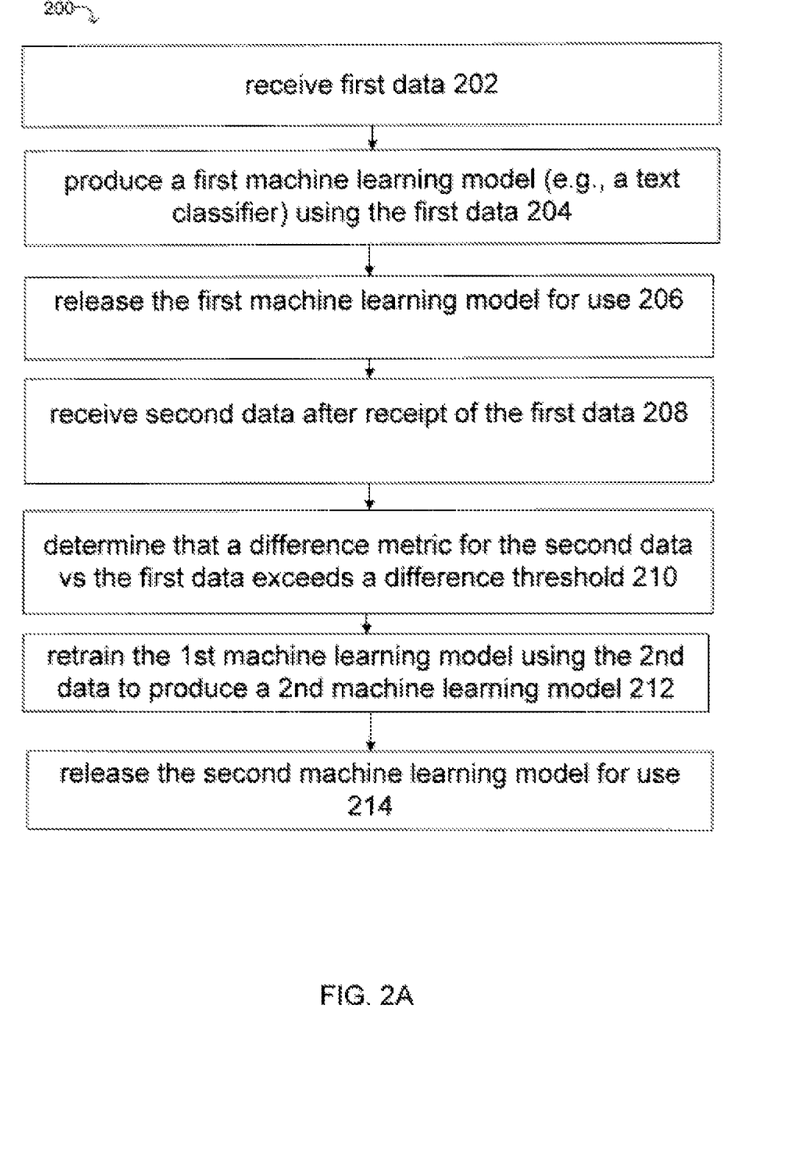
FIG. 2A is a flowchart for an example process for dynamically updating a text classifier.

FIG. 2A is a flowchart of an example process 200 for dynamically updating a machine learning model such as a text classifier. For convenience, the process 200 will be described as being performed by a system of one or more computers, located in one or more locations, and programmed appropriately in accordance with this specification. For example, a dynamic text classifier production system, e.g., the dynamic text classifier production system 100 of FIG. 1, appropriately programmed, can perform the process 200.

The process 200 includes: receiving first data 202 (e.g., first documents); producing/training a first machine learning model 204 (e.g., a first text classifier) using the first data; releasing the first machine learning model 206 for use; receiving second data 208 (e.g., second documents) after receipt of the first data; determining 210 that the second data has a difference metric (e.g., a drift metric) relative to the first data that exceeds a difference threshold; retraining 212 the first machine learning model using at least part of the second data, the retraining producing a second machine learning model (e.g., a second text classifier); and releasing 214 the second machine learning model for use (e.g., replacing the first machine learning model with the second machine learning model).

Figure 2B:
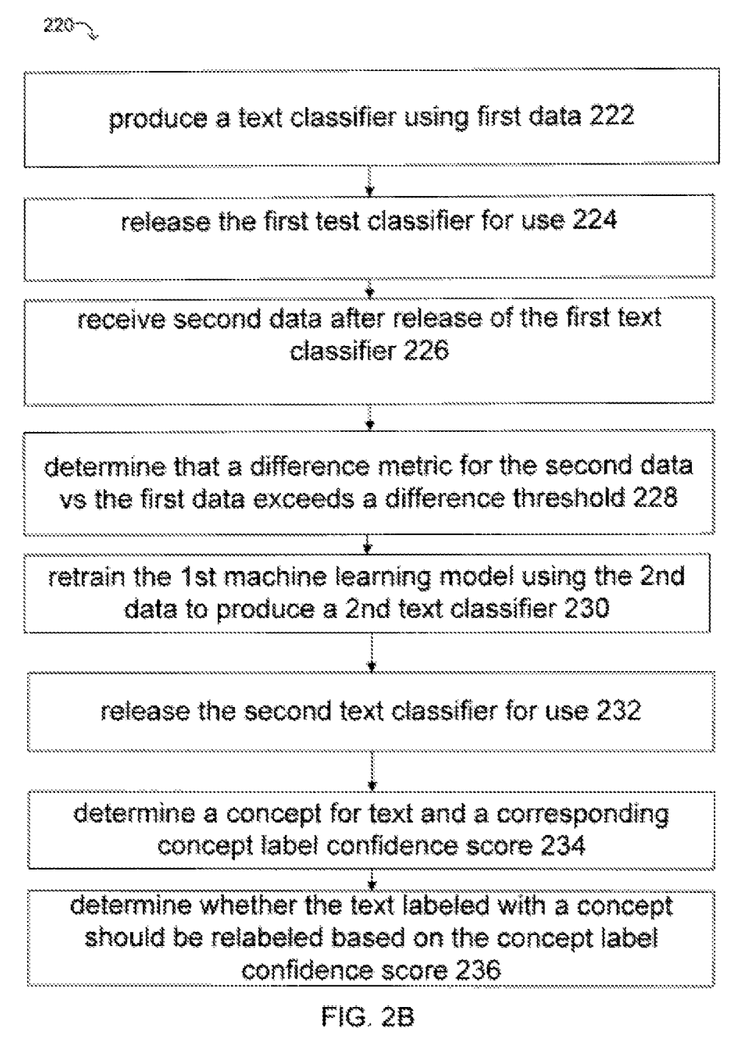
FIG. 2B is a flowchart of an example process for dynamically updating a text classifier that incorporates active learning.

FIG. 2B is a flowchart of an example process 220 for dynamically updating a machine learning model such as a text classifier and including active learning. The process 220 includes: producing 222 a first machine learning model (e.g., a text classifier) using first data (e.g., first documents); releasing 224 the first machine learning model for use; receiving 226 second data after release of the first machine learning model; determining 228 that a difference metric for the second data versus the first data exceeds a difference threshold; retraining 230 the first machine learning using the second data to produce a second machine learning model (e.g., a second text classifier); releasing 232 the second machine learning model for use; determining 234 a concept for text (e.g., a document) and a concept label confidence score indicating the confidence that the concept labeling engine has in attaching a concept label to the text; and determining 236 whether the text labeled with a concept should be given a ground truth label based on, for example, the concept label confidence score, e.g., if the score is below a threshold.

One can make a distinction between the initial prediction that the concept model makes and a ground-truth label, i.e., that which is assumed as correct for the document and assigned by a human and/or an independent ground-truth labeling system. Hence, the concept model produces a prediction of a correct label (along with the concept label confidence score), which may be used to determine whether a document should be assigned a ground-truth label. The determination to provide a ground truth label for a data point does not necessarily involve the confidence score. For example, one implementation can decide to assign a document for receiving a ground truth label based on the document's difference from any other document in the training set.

Figure 3:
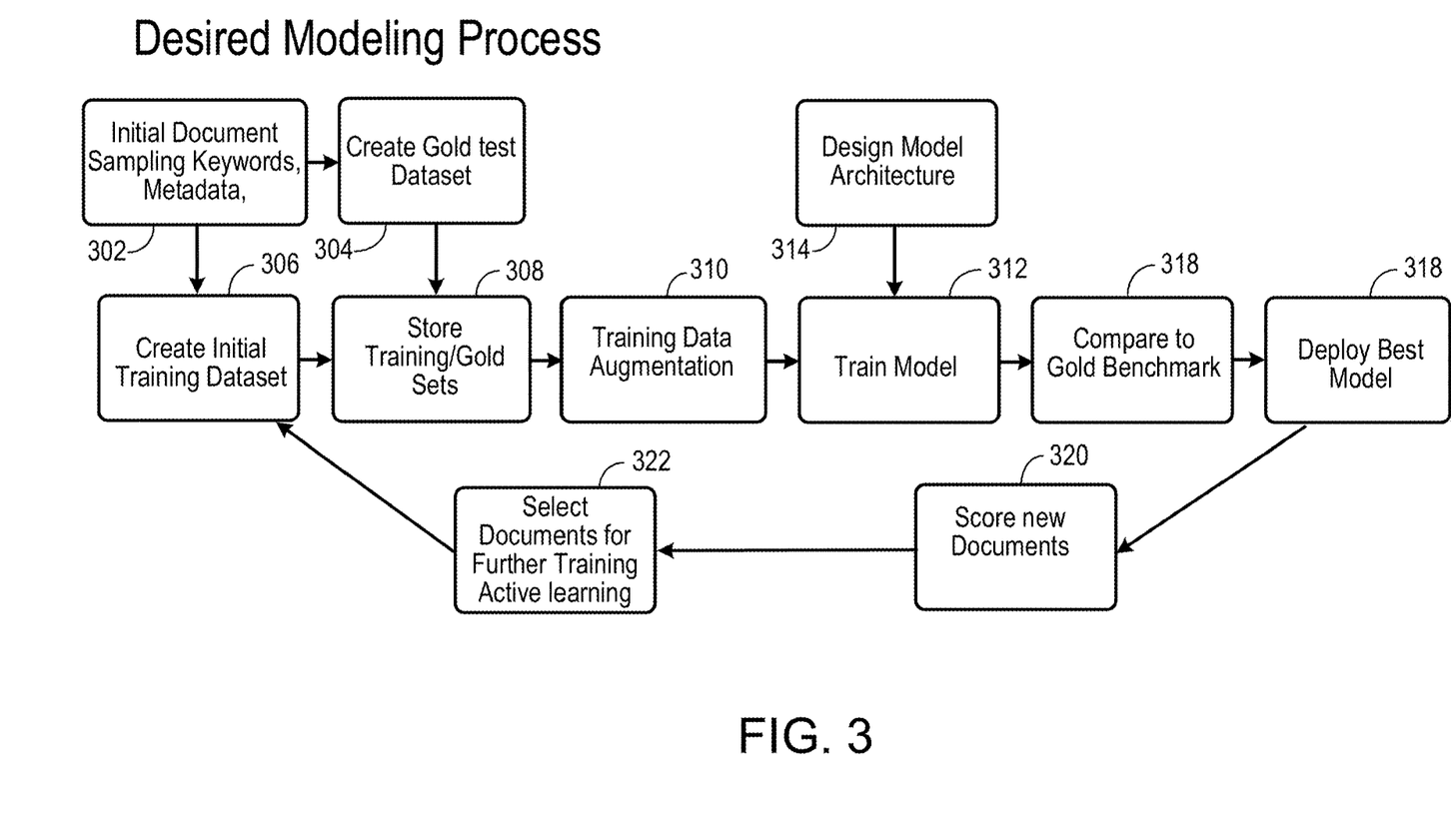
FIG. 3 is an example of a process for dynamically updating text classifiers.

FIG. 3 shows an example of a modeling process for a dynamic machine learning model production system. The illustrated process 300 includes initial document sampling 302 that selects documents based on criteria such as keywords and/or selected metadata. The process 300 continues by splitting the sampled data from the initial document sampling into a gold standard test dataset 304 and an initial training dataset 306 and stores 308 those two data sets. A gold standard dataset is a collection of articles curated to contain essential documents related to a particular concept that the model in question should classify correctly. It can consist of, for example, 100 to 200 articles never seen during the model building process. The gold standard set can be the ultimate dataset on which model performance is assessed.

In another embodiment of the process, the gold standard set can be assembled using human or automated insight. In the case of human annotators, the system provides annotators a list of documents, either during initial training set curation or during the active learning process after an initial model has been released, for annotation. The system allows the annotators, in addition to assigning a label to the document, to indicate that a document should be included in a gold standard dataset.

The process 300 then augments 310 the training data set. Training data augmentation is one way the system is able to use a small number of training examples efficiently. Textual data augmentation methods include synonym substitution (automatically generating novel examples from existing examples by replacing a selection of terms or phrases with related terms or phrases), translation of an example from the source language to another language and back (to preserve semantic meaning but alter the syntactic structure), and linking parts of a training example with relevant data from an external knowledge base such as Wikipedia.

The process 300 continues by using the training dataset to train 312 a machine learning model (e.g., a text classifier) based on a design model architecture 314. The process then compares 316 the model to the gold standard data. In some embodiments, the process can use the F2 metric in evaluating the model, which combines precision and recall but is skewed towards avoiding false negative classifications. Because the probability that a randomly-selected document is relevant to a given topic is so low, a simple accuracy score is likely to be misleadingly high. Thus, the process can use the F2 metric or another, mathematically similar, alternative performance metric to avoid leaving relevant articles untagged at the risk of tagging slightly more irrelevant articles in the process.

The process 300 can produce a set of models and deploy the best model 318. The process can curate a gold standard dataset to use as a final validator of model performance. As noted above, the gold standard set can be the ultimate dataset on which model performance is assessed; a new concept model can be required to do better in predicting results reflected in the concept's gold standard dataset before the new model replaces an existing model in production.

The process continues by scoring new documents 320. The term "drift" and the term "difference" are used interchangeably herein and can describe a divergence between a model's linguistic calibration for a particular concept (learned at training time) and the way that the concept is discussed in current documents. As noted above with reference to FIG. 1, the system can include a threshold for drift, which triggers a concept model retraining if exceeded, and can be called a drift detection model. Some reasons for drift might be:

Cyclical/seasonal effects—the language model (order and frequency of words) associated with a concept may change cyclically. For example, articles about the economy might be written differently depending on whether the economy is experiencing a bull market or a recession; articles about national environmental issues might differ based on whether there is a Democratic or Republican president; and articles about politics may differ based on whether the country is involved in a presidential election cycle.

Exogenous effects—the language associated with a concept may evolve naturally over time. For example, articles about environmental issues may start to focus on water shortages and weather events rather than on carbon and methane emissions if the underlying prevailing concerns begin to shift.

Personnel changes—the people associated with a concept may evolve naturally over time, eroding the performance of a model trained before the shift. For example, articles about environmental issues can feature fewer and fewer mentions of a former head of the EPA as his incumbency recedes further into the past. More insidiously, suppose that a CEO departs a large cybersecurity company for a large AI company. A cybersecurity concept model may start to emit false positive predictions after her departure, and an AI concept model may start to emit false negative predictions because it hasn't seen her name associated with positive examples.

Finally, the process 300 can include selecting documents 322 for further training using an active learning engine as described above with reference to FIG. 1. The selected documents are annotated and then fed back into the training dataset.

The technologies described in this specification can also be used to update dynamically machine learning model types besides a text classifier model type. One arena in which active learning has potential is in radiographic diagnosis. For example, active learning can be used if one is building a model to detect a rare disease on the basis of x-rays and one has access to millions of x-rays in a database, but only a few of the x-rays are actually labeled as corresponding to a patient with or without the rare disease. Assume there are many other x-rays in the database that are true positives or true negatives, but those x-rays are unlabeled with respect to the disease. One can train a first model using the small amount of disease-specific data, then one can use the first model and the active learning approach described herein to select those unlabeled x-rays that, when combined with a label that describes whether the x-ray corresponds to a positive or negative diagnosis of the disease, will give the model more predictive power. Of course, doing so can mean asking expensive (human) MD radiologists what the diagnosis is for the selected unlabeled images that the system is going to put into the set of labeled training examples, so the system has to be economical with the number of examples it asks to be labeled.

Active learning is perhaps most useful when there is a confluence of: (i) little initial labeled data; (ii) large initial unlabeled data; and (iii) high human expense in getting all the unlabeled data labeled. Active learning aims to choose the smallest number of unlabeled examples to present to the expensive human expert such that the model performs at an acceptable level.

Advantages of the technologies described in this specification include creating machine learning models (e.g., text classifiers) quickly and automatically. It currently can take days to create a text classifier that relies on human-generated data. The technologies described in the present specification can create a similar text classifier in a fraction of that time, as low as 30 minutes.

Implementations described in this specification can create high-quality models using a relatively small initial training set for the following reasons:

1. The document sampling step chooses documents with exceptionally high information richness, as described above.

2. The system can use training data augmentation techniques as described to imbue the small amount of labeled data with a large amount of prior, background information, such as the Wikipedia page related to the concept at hand.

3. The system can simulate using a very large number of unlabeled documents an overall English language model as a prior so that the model doesn't have to learn language from nothing, but rather learns the particular deviation from the prior that corresponds to the language model for the concept at hand.

Systems described in this specification can create many text classifiers automatically and in parallel. Such systems can also automatically monitor performance, measuring output and getting an early indication of a data/model mismatch. Furthermore such systems can quickly update a model only when necessary by automatically altering training data and initiating retraining of the model using the altered training data.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving first data;
   producing a first machine learning model using the first data;
   releasing the first machine learning model for use;

receiving second data after receipt of the first data;
determining that the second data has a difference metric relative to the first data that exceeds a difference threshold, wherein the first machine learning model is a first text classifier and the second machine learning model is a second text classifier, wherein the first data are first documents and the second data are second documents, and wherein determining that the second data has a difference metric relative to the first data that exceeds a difference threshold comprises determining that the second documents have a difference metric relative to the first documents that exceeds a difference threshold based at least in part on the words used in the second documents:
determining, at a concept labeling engine, at least one concept for a document and a concept label confidence score;
determining, at an active learning engine, whether a document labeled by the concept labeling engine should be assigned a ground-truth label based at least in part on whether a concept label confidence score is below a threshold;
retraining the first machine learning model using at least part of the second data, the retraining producing a second machine learning model; and
releasing the second machine learning model for use.

2. The method of claim 1, wherein releasing the first machine learning model for use comprises:
determining a performance metric for the first machine learning model; and
determining that the performance metric for the first machine learning model exceeds a performance threshold.

3. The method of claim 2, wherein using the first data to produce a first machine learning model comprises using at least a portion of the first data to produce a plurality of machine learning models and wherein releasing the first machine learning model for use comprises selecting a first machine learning model to release, from the plurality of machine learning models, based at least in part on the performance metric.

4. A method comprising:
receiving first data;
using the first data to produce a first machine learning model;
forwarding the first machine learning model for use prior to receiving post release data;
receiving post release data after the first machine learning model has been released, the first machine learning model having been trained using first data;
determining that the post release data has a difference metric relative to the first data that exceeds a difference threshold, wherein the first machine learning model is a first text classifier and the second machine learning model is a second text classifier, wherein the first data are first documents and the post release data are second documents, and wherein determining that the post release data has a difference metric relative to the first data that exceeds a difference threshold comprises determining that the second documents have a difference metric relative to the first documents that exceeds a difference threshold based at least in part on the words used in the second documents;
determining, at a concept labeling engine, at least one concept for a document and a concept label confidence score;
determining, at an active learning engine, whether a document labeled by the concept labeling engine should be assigned a ground-truth label based at least in part on whether a concept label confidence score is below a threshold;
retraining the first machine learning model to produce a second machine learning model using at least part of the post release data; and
forwarding the second machine learning model for use.

5. The method of claim 4, wherein receiving first data comprises automatically sampling data to produce sampled first data and wherein using the first data to produce a first machine learning model comprises using the sampled first data to produce the first machine learning model.

6. The method of claim 5, wherein receiving first data comprises augmenting the sampled first data to produce augmented sampled first data and wherein using the first data to produce a first machine learning model comprises using the augmented sampled first data to produce the first machine learning model.

7. The method of claim 4, wherein the method further comprises selecting data from the post release data to use at least in part in retraining the first machine learning model.

8. A system comprising:
one or more computers and one or more storage devices on which are stored instructions that are operable, when executed by the one or more computers, to cause the one or more computers to perform operations comprising:
receiving first data;
using the first data to produce a first machine learning model;
releasing the first machine learning model for use;
receiving second data after receipt of the first data;
determining that the second data has a difference metric relative to the first data that exceeds a difference threshold, wherein the first machine learning model is a first text classifier and the second machine learning model is a second text classifier, wherein the first data are first documents and the second data are second documents, and wherein determining that the post first release data has a difference metric relative to the first data that exceeds a difference threshold comprises determining that the second documents have a difference metric relative to the first documents that exceeds a difference threshold based at least in part on the words used in the second documents;
determining, at a concept labeling engine, at least one concept for a document and a concept label confidence score;
determining, at an active learning engine, whether a document labeled by the concept labeling engine should be assigned a ground-truth label based at least in part on whether a concept label confidence score is below a threshold;
retraining the first machine learning model using at least part of the second data, the retraining producing a second machine learning model; and
releasing the second machine learning model for use.

9. A method comprising:
receiving first documents;
using the first documents to train a first text classifier; and
forwarding the first text classifier for use prior to receiving post release documents;

receiving the post release documents after the first text classifier has been released, the first text classifier having been trained using first documents;

determining that the post release documents have a difference metric relative to the first documents that exceeds a difference threshold, wherein the first text classifier comprises at least one of data describing a concept and data predictive of the concept, and wherein determining that the post release documents have a difference metric relative to the first documents that exceeds a difference threshold comprises determining that the post release documents have a difference metric relative to the first documents that exceeds a difference threshold based at least in part on the words used in the post release documents;

determining, at a concept labeling engine, at least one concept for a document and a concept label confidence score;

determining, at an active learning engine, whether a document labeled by the concept labeling engine should be assigned a ground-truth label based at least in part on whether a concept label confidence score is below a threshold;

retraining the first text classifier to produce a second text classifier using at least part of the post release documents; and forwarding the second text classifier for use.

* * * * *